US00RE48566E

(19) United States
(12) Reissued Patent
MacKay et al.

(10) Patent Number: US RE48,566 E
(45) Date of Reissued Patent: May 25, 2021

(54) PARKING METER

(71) Applicant: J.J. MacKay Canada Limited, New Glasgow (CA)

(72) Inventors: George Allan MacKay, New Glasgow (CA); James George MacKay, New Glasgow (CA); Adrian Ignatius O'Neil, New Glasgow (CA); Robert Steven Cosh, Antigonish (CA); Darren Scott Cameron, New Glasgow (CA); Gregory Emile Chauvin, Brookside (CA); David Andrew McMullin, Ottawa (CA); Michael Brown, Ottawa (CA); Matthew Watson, Ottawa (CA)

(73) Assignee: J.J. MacKay Canada Limited, New Glasgow (CA)

(21) Appl. No.: 29/697,683

(22) Filed: Jul. 10, 2019

Related U.S. Patent Documents

Reissue of:
(64) Patent No.: Des. 792,788
Issued: Jul. 25, 2017
Appl. No.: 29/551,552
Filed: Jan. 14, 2016

(30) Foreign Application Priority Data

Jul. 15, 2015 (CA) ..... 163328

(51) LOC (13) Cl. ..... 10-03
(52) U.S. Cl.
USPC ..... D10/42
(58) Field of Classification Search
USPC ..... D10/40, 41, 42, 43, 44, 49, 50, 52, 75, D10/80, 103; D13/162, 173, 184, 199; D99/35, 43
CPC ..... G07F 17/24; G07F 17/242; G07F 17/244; G07F 17/246; G07C 1/30; G09F 23/00
See application file for complete search history.

(56) References Cited

U.S. PATENT DOCUMENTS

| | | | | |
|---|---|---|---|---|
| 480,108 | A | | 8/1892 | Loch |
| 1,189,991 | A | | 7/1916 | Mugler |
| 1,445,771 | A | | 2/1923 | Keplinger |
| 1,818,568 | A | | 8/1931 | Melick |
| D98,810 | S | | 3/1936 | Magee |
| D100,875 | S | | 8/1936 | Michaels |
| D101,237 | S | | 9/1936 | Miller |
| D107,577 | S | | 12/1937 | McGay et al. |
| 2,118,318 | A | | 5/1938 | Magee |
| D112,677 | S | | 12/1938 | Broussard et al. |
| 2,161,046 | A | | 6/1939 | Hitzeman |
| D116,805 | S | | 9/1939 | Reznek |
| 2,229,183 | A | | 1/1941 | Mitchell |
| 2,261,353 | A | | 11/1941 | Fedele |
| 2,289,838 | A | | 7/1942 | Herschede et al. |
| D152,294 | S | | 1/1949 | Siegel et al. |
| D152,587 | S | | 2/1949 | Brundage |
| D154,716 | S | | 8/1949 | Simpson |
| 2,483,805 | A | | 10/1949 | Broussard et al. |
| 2,495,784 | A | | 1/1950 | Starts |
| D161,888 | S | * | 2/1951 | Wilkin ..... D10/42 |
| D162,698 | S | | 3/1951 | Teague |
| 2,546,433 | A | | 3/1951 | Dick |
| 2,547,272 | A | | 4/1951 | Lawson et al. |
| 2,550,433 | A | | 4/1951 | Tichenor |
| 2,570,920 | A | | 10/1951 | Clough et al. |
| D166,059 | S | | 2/1952 | Yoss |
| 2,594,388 | A | | 4/1952 | Broussard |
| 2,595,124 | A | | 4/1952 | Campbell |
| D166,753 | S | | 5/1952 | Jones |
| 2,596,122 | A | | 5/1952 | Broussard |
| 2,596,123 | A | | 5/1952 | Broussard |
| 2,596,124 | A | | 5/1952 | Broussard |
| 2,599,881 | A | | 6/1952 | Woodruff |
| 2,613,792 | A | | 10/1952 | Broussard et al. |
| 2,613,871 | A | | 10/1952 | Broussard et al. |
| 2,618,371 | A | | 11/1952 | Broussard |
| 2,633,960 | A | | 4/1953 | Broussard |
| D181,359 | S | | 11/1957 | Jones |
| 2,818,371 | A | | 12/1957 | Wessinger |
| 2,822,682 | A | | 2/1958 | Sollenberger |
| 2,832,506 | A | | 4/1958 | Hatcher |
| D189,106 | S | | 10/1960 | Leiderman |
| 2,956,525 | A | | 10/1960 | Blauvelt |
| 2,985,978 | A | | 5/1961 | Breen et al. |
| 2,988,191 | A | | 6/1961 | Grant |
| 2,995,230 | A | | 8/1961 | Moody et al. |
| 3,018,615 | A | | 1/1962 | Minton et al. |
| 3,056,544 | A | | 10/1962 | Sollenberger et al. |

Amended

D199,270 S 9/1964 Michaels
D200,216 S 2/1965 Broussard
3,183,411 A 5/1965 Palfi
3,199,321 A 8/1965 Sollenberger
3,204,438 A 9/1965 Sollenberger
3,208,061 A 9/1965 Gervasi et al.
3,262,540 A 7/1966 Sollenberger et al.
3,272,299 A 9/1966 Sollenberger
3,324,647 A 6/1967 Jedynak
3,373,856 A 3/1968 Kusters et al.
3,438,031 A 4/1969 Fathauer
3,486,324 A 12/1969 Andersson
3,519,113 A 7/1970 Arzig et al.
3,535,870 A 10/1970 Mitchell
3,565,283 A 2/1971 Sciacero et al.
3,637,277 A 1/1972 Krug et al.
3,666,067 A 5/1972 Kaiser
3,721,463 A 3/1973 Attwood et al.
3,770,090 A 11/1973 Fayling et al.
D234,606 S * 3/1975 Gamble ..... D23/366
3,941,989 A 3/1976 McLaughlin et al.
3,975,934 A 8/1976 Babai et al.
3,982,620 A 9/1976 Kortenhaus
3,991,595 A 11/1976 Bahry et al.
3,999,372 A 12/1976 Welch et al.
4,031,991 A 6/1977 Malott
4,043,117 A 8/1977 Maresca et al.
4,147,707 A 4/1979 Alewelt et al.
4,237,710 A 12/1980 Cardozo
4,248,225 A 2/1981 Fiedler
4,249,648 A 2/1981 Meyer
4,264,963 A 4/1981 Leach
4,306,219 A 12/1981 Main et al.
4,317,180 A 2/1982 Lies
4,317,181 A 2/1982 Teza et al.
4,323,847 A 4/1982 Karbowski
4,379,334 A 4/1983 Feagins, Jr. et al.
4,409,665 A 10/1983 Tubbs
4,432,447 A 2/1984 Tanaka
4,460,080 A 7/1984 Howard
4,474,281 A 10/1984 Roberts et al.
4,479,191 A 10/1984 Nojima et al.
4,483,431 A 11/1984 Pratt
D278,689 S 5/1985 Jupe
4,574,936 A 3/1986 Klinger
4,639,021 A 1/1987 Hope
D288,441 S * 2/1987 Lalonde ..... 52/27
D289,914 S * 5/1987 Willinger ..... D23/210
4,678,994 A 7/1987 Davies
4,742,903 A 5/1988 Trummer
4,749,074 A 6/1988 Ueki et al.
D296,795 S 7/1988 Bouve
4,763,769 A 8/1988 Levasseur
4,809,838 A 3/1989 Houserman
4,812,805 A 3/1989 Lachat et al.
4,823,928 A 4/1989 Speas
4,825,425 A 4/1989 Turner
4,827,206 A 5/1989 Speas
4,845,484 A 7/1989 Ellsberg
4,848,556 A 7/1989 Shah et al.
4,854,987 A 7/1989 Day
4,872,149 A 10/1989 Speas
4,875,598 A 10/1989 Dahl
4,880,097 A 11/1989 Speas
4,880,406 A 11/1989 Van Horn et al.
4,895,238 A 1/1990 Speas
4,951,799 A 8/1990 Kai
4,967,895 A 11/1990 Speas
4,967,985 A 11/1990 Deakin
4,976,630 A 12/1990 Schuder et al.
4,989,714 A 2/1991 Abe
5,027,935 A 7/1991 Berg et al.
5,029,094 A 7/1991 Wong
D319,077 S 8/1991 Arato et al.
5,060,777 A 10/1991 Van Horn et al.
5,065,156 A 11/1991 Bernier
5,076,414 A 12/1991 Kimoto
5,088,073 A 2/1992 Speas
5,109,972 A 5/1992 Van Horn et al.
5,119,916 A 6/1992 Carmen et al.
5,155,614 A 10/1992 Carmen et al.
5,158,166 A 10/1992 Barson
5,184,707 A 2/1993 Van Horn et al.
5,192,855 A 3/1993 Insulander et al.
D336,860 S 6/1993 Clough
5,222,076 A 6/1993 Ng et al.
5,244,070 A 9/1993 Carmen et al.
D340,038 S 10/1993 Venne et al.
5,259,491 A 11/1993 Ward, II
5,266,947 A 11/1993 Fujiwara et al.
D342,209 S 12/1993 Clough
5,273,151 A 12/1993 Carmen et al.
5,287,384 A 2/1994 Avery et al.
5,293,979 A 3/1994 Levasseur
5,298,894 A 3/1994 Cerny et al.
5,343,237 A 8/1994 Morimoto
D351,193 S 10/1994 Abe
5,351,798 A 10/1994 Hayes
5,360,095 A 11/1994 Speas
D354,835 S 1/1995 Brendel
5,382,780 A 1/1995 Carmen
5,402,475 A 3/1995 Lesner, Jr. et al.
5,407,049 A 4/1995 Jacobs
D360,734 S 7/1995 Hall
D360,737 S * 7/1995 Helbig, Jr. ..... D99/28
5,439,089 A 8/1995 Parker
5,442,348 A 8/1995 Mushell
5,454,461 A 10/1995 Jacobs
D364,165 S * 11/1995 Esslinger ..... D14/213
5,471,139 A 11/1995 Zadoff
5,475,373 A 12/1995 Speas
5,489,014 A 2/1996 Menoud
5,500,517 A 3/1996 Cagliostro
5,526,662 A 6/1996 Diekhoff et al.
5,563,491 A 10/1996 Tseng
5,568,441 A 10/1996 Sanemitsu
D375,607 S 11/1996 Hall
5,570,771 A 11/1996 Jacobs
5,573,099 A 11/1996 Church et al.
5,614,892 A 3/1997 Ward, II et al.
5,617,942 A 4/1997 Ward, II et al.
5,619,932 A 4/1997 Efland et al.
5,640,002 A 6/1997 Ruppert et al.
5,642,119 A 6/1997 Jacobs
5,648,906 A 7/1997 Amirpanahi
D381,976 S 8/1997 Sandor et al.
5,659,306 A 8/1997 Bahar
5,687,129 A 11/1997 Kim
D388,231 S 12/1997 Magee et al.
5,710,743 A 1/1998 Dee et al.
D391,238 S 2/1998 Sakata
5,732,812 A 3/1998 Grainger et al.
D393,212 S 4/1998 Lucas
5,737,710 A 4/1998 Anthonyson
5,740,050 A 4/1998 Ward, II
5,748,103 A 5/1998 Flach et al.
D395,133 S 6/1998 Mikami et al.
5,761,061 A 6/1998 Amano
5,777,302 A 7/1998 Nakagawa et al.
5,777,951 A 7/1998 Mitschele et al.
5,777,957 A 7/1998 Lyman
5,778,067 A 7/1998 Jones et al.
D396,655 S 8/1998 Anderson
5,803,228 A 9/1998 Lucas
5,805,083 A 9/1998 Sutton et al.
5,806,651 A 9/1998 Carmen et al.
D400,115 S 10/1998 Yaron et al.
5,833,042 A 11/1998 Baitch et al.
5,841,369 A 11/1998 Sutton et al.
5,842,411 A 12/1998 Johnson
5,845,268 A 12/1998 Moore
5,852,411 A 12/1998 Jacobs et al.
D404,025 S 1/1999 Van Horne et al.
5,903,520 A 5/1999 Dee et al.
5,906,260 A 5/1999 Goodrich
5,911,763 A 6/1999 Quesada
D411,848 S 7/1999 Maruska et al.
D412,289 S 7/1999 Winwood D413,311 S 8/1999 Blalock
5,936,527 A 8/1999 Isaacman et al.
5,940,481 A 8/1999 Zeitman
5,954,182 A 9/1999 Wei
5,966,345 A 10/1999 Dee et al.
6,026,946 A 2/2000 McCarty, Jr.
6,037,880 A 3/2000 Manion
6,052,453 A 4/2000 Sagady et al.
6,078,272 A 6/2000 Jacobs et al.
6,081,205 A 6/2000 Williams
6,081,206 A 7/2000 Kielland
6,082,153 A 7/2000 Schoell et al.
6,098,361 A 8/2000 Roten et al.
6,107,942 A 8/2000 Yoo et al.
6,109,418 A 8/2000 Yost
6,111,522 A 8/2000 Hiltz et al.
6,116,403 A 9/2000 Kiehl
D431,788 S * 10/2000 Tuxen ..... D10/42
6,132,152 A 10/2000 Kaibach et al.
6,147,624 A 11/2000 Clapper
6,188,328 B1 2/2001 Ho
6,193,045 B1 2/2001 Ishida et al.
6,195,015 B1 2/2001 Jacobs et al.
D439,591 S 3/2001 Reidt et al.
6,227,343 B1 5/2001 Neathway et al.
6,229,455 B1 5/2001 Yost et al.
6,230,868 B1 5/2001 Tuxen et al.
6,243,028 B1 6/2001 Krygler et al.
6,243,029 B1 * 6/2001 Tomer ..... G07B 15/02 235/378
6,275,169 B1 8/2001 Krygler et al.
6,275,170 B1 8/2001 Jacobs et al.
D447,714 S 9/2001 Cappiello
D448,910 S 10/2001 Kit et al.
D449,010 S 10/2001 Petrucelli
6,309,098 B1 10/2001 Wong
D450,253 S 11/2001 Marguet
6,312,152 B2 11/2001 Dee et al.
6,321,201 B1 11/2001 Dahl
6,340,935 B1 1/2002 Hall
6,344,806 B1 2/2002 Katz
D454,421 S 3/2002 Jeon et al.
D454,807 S 3/2002 Cappiello
6,354,425 B1 3/2002 Tuxen et al.
6,366,220 B1 4/2002 Elliott
6,373,401 B2 4/2002 Ho
6,373,422 B1 4/2002 Mostafa
6,373,442 B1 4/2002 Thomas et al.
6,380,851 B1 4/2002 Gilbert et al.
D460,005 S 7/2002 Jacquet
D461,728 S 8/2002 Tuxen et al.
6,456,491 B1 9/2002 Flannery et al.
D463,749 S 10/2002 Petrucelli
6,457,586 B2 10/2002 Yasuda et al.
6,467,602 B2 10/2002 Bench et al.
6,477,875 B2 11/2002 Field et al.
D467,954 S 12/2002 Suzuki et al.
6,493,676 B1 12/2002 Levy
6,505,774 B1 1/2003 Fulcher et al.
D471,238 S 3/2003 Showers et al.
D472,362 S 3/2003 Zerman et al.
6,559,776 B2 5/2003 Katz
6,575,281 B2 6/2003 Lee
D477,030 S 7/2003 Kolls et al.
D481,516 S 10/2003 Magee et al.
D485,417 S 1/2004 Magee et al.
6,697,730 B2 2/2004 Dickerson
D488,280 S 4/2004 Zerman et al.
D492,080 S 6/2004 Magee et al.
D492,081 S 6/2004 Magee et al.
6,747,575 B2 6/2004 Chauvin et al.
6,763,094 B2 7/2004 Conn et al.
D494,730 S 8/2004 Magee et al.
6,791,473 B2 9/2004 Kibria et al.
D497,393 S 10/2004 Herbst
6,799,387 B2 10/2004 Pippins
D497,814 S 11/2004 Odinotski et al.
D498,795 S 11/2004 Nunn
6,823,317 B1 11/2004 Ouimet et al.
6,856,922 B1 2/2005 Austin et al.
6,874,340 B1 4/2005 Berman
D505,240 S 5/2005 Swaine et al.
6,889,899 B2 5/2005 Silberberg
D506,509 S 6/2005 Nunn
D506,769 S 6/2005 Asai
6,914,411 B2 7/2005 Couch et al.
D508,064 S 8/2005 Ramirez
6,929,179 B2 8/2005 Fulcher et al.
D510,751 S 10/2005 Magee et al.
7,004,385 B1 2/2006 Douglass
7,014,355 B2 3/2006 Potter, Sr. et al.
7,019,420 B2 3/2006 Kogan et al.
7,019,670 B2 3/2006 Bahar
7,027,773 B1 4/2006 McMillin
7,027,808 B2 4/2006 Wesby
7,028,888 B2 4/2006 Laskowski
7,029,167 B1 4/2006 Mitschele
7,040,534 B2 5/2006 Turocy et al.
D524,834 S 7/2006 Dozier et al.
7,071,839 B2 7/2006 Patel et al.
7,104,447 B1 9/2006 Lopez et al.
7,114,651 B2 10/2006 Hjelmvik
7,181,426 B2 2/2007 Dutta
7,183,999 B2 2/2007 Matthews et al.
D538,505 S 3/2007 Kang et al.
D543,588 S 5/2007 Herbert et al.
7,222,031 B2 5/2007 Heatley
7,222,782 B2 5/2007 Lute, Jr. et al.
7,237,176 B2 6/2007 Briggs et al.
D546,365 S 7/2007 Jost et al.
7,237,716 B2 7/2007 Silberberg
7,253,747 B2 8/2007 Noguchi
7,284,692 B1 10/2007 Douglass
7,319,974 B1 1/2008 Brusseaux
7,330,131 B2 2/2008 Zanotti et al.
D570,920 S 6/2008 Choi
7,382,238 B2 6/2008 Kavaler
7,382,281 B2 6/2008 Kavaler
7,382,282 B2 6/2008 Kavaler
7,388,349 B2 6/2008 Elder et al.
7,388,517 B2 6/2008 Kavaler
7,393,134 B2 7/2008 Mitschele
D575,168 S 8/2008 King et al.
7,419,091 B1 9/2008 Scanlon
7,427,931 B1 9/2008 Kavaler et al.
D579,795 S 11/2008 Martinez et al.
7,445,144 B2 11/2008 Schlabach et al.
D582,125 S 12/2008 Kang et al.
D587,141 S 2/2009 King et al.
D588,916 S * 3/2009 DeMarco ..... D9/504
7,533,802 B1 5/2009 McGinley et al.
D596,374 S 7/2009 Kang et al.
7,558,564 B2 7/2009 Wesby
7,594,235 B2 9/2009 Moreau
D602,225 S 10/2009 Lute et al.
7,617,120 B2 11/2009 Derasmo et al.
D605,145 S 12/2009 Kellar
7,624,919 B2 12/2009 Meek et al.
7,699,224 B2 4/2010 Molé
D615,274 S 5/2010 Kim et al.
D617,799 S 6/2010 Odhe et al.
7,739,000 B2 6/2010 Kavaler
7,748,620 B2 7/2010 Gomez et al.
7,772,720 B2 8/2010 McGee et al.
7,780,072 B1 8/2010 Lute et al.
D625,305 S 10/2010 Bleck et al.
7,806,248 B2 10/2010 Hunter et al.
D627,814 S 11/2010 Tzeng et al.
7,825,826 B2 11/2010 Welch
7,854,310 B2 * 12/2010 King ..... G06Q 20/18 194/350
7,855,661 B2 12/2010 Ponert
7,874,482 B2 1/2011 Mitschele
D632,740 S 2/2011 Adeline
D634,417 S * 3/2011 Abbondanzio ..... D23/366
7,933,841 B2 4/2011 Schmeyer et al.
D645,223 S 9/2011 Bleck et al.
8,035,533 B2 10/2011 Kavaler 8,044,139 B2 10/2011 Youn et al.
D652,329 S 1/2012 MacKay et al.
D652,872 S 1/2012 Mougin et al.
D653,014 S 1/2012 Rohan et al.
D653,420 S 1/2012 Rohan et al.
D653,421 S 1/2012 Rohan et al.
D653,424 S 1/2012 Rohan et al.
D654,816 S 2/2012 MacKay et al.
D655,263 S 3/2012 Tsai
D656,046 S 3/2012 MacKay et al.
8,138,950 B1 3/2012 Leung
8,144,034 B2 3/2012 Kavaler
D659,557 S 5/2012 Jones et al.
8,184,019 B2 5/2012 Chauvin et al.
D661,603 S 6/2012 MacKay et al.
8,193,540 B2 6/2012 Huang et al.
8,232,894 B2 7/2012 Weiss et al.
8,264,401 B1 9/2012 Kavaler
8,279,107 B2 10/2012 Krstanovic et al.
D672,525 S 12/2012 Lee et al.
D674,985 S 1/2013 Lee
D677,035 S 2/2013 Lee et al.
8,395,532 B2 3/2013 Chauvin et al.
8,402,281 B2 3/2013 Dahl
D680,156 S 4/2013 Hernandez et al.
D681,717 S 5/2013 Helgesson et al.
8,450,627 B2 5/2013 Mittleman et al.
D683,779 S 6/2013 Uemachi et al.
D683,794 S 6/2013 Randall
D683,795 S 6/2013 Randall
D684,745 S 6/2013 Reuter et al.
D684,870 S 6/2013 Jones et al.
8,479,909 B2 7/2013 King et al.
8,487,754 B2 7/2013 Mitschele
D687,809 S * 8/2013 Bergmann ..... D14/209.1
8,513,832 B2 8/2013 Hunter et al.
D690,771 S 10/2013 Randall
D691,165 S 10/2013 Attoma
8,566,159 B2 10/2013 King et al.
D692,784 S 11/2013 Anderssen et al.
D693,983 S 11/2013 Budde et al.
8,589,216 B2 11/2013 Yu et al.
8,590,687 B2 11/2013 King et al.
8,595,054 B2 11/2013 King et al.
D696,484 S 12/2013 Lee et al.
D696,485 S 12/2013 Lee et al.
8,621,245 B2 12/2013 Shearer et al.
8,631,921 B2 1/2014 Jones et al.
8,662,279 B2 3/2014 Jones et al.
8,666,801 B2 3/2014 Cho
D702,913 S 4/2014 Budde et al.
D702,914 S 4/2014 Budde et al.
8,684,158 B2 4/2014 Jones et al.
D705,090 S 5/2014 MacKay et al.
8,727,207 B1 5/2014 Church et al.
D707,140 S 6/2014 King et al.
D707,141 S 6/2014 King et al.
D707,142 S 6/2014 King et al.
8,749,403 B2 6/2014 King et al.
8,770,371 B2 * 7/2014 MacKay ..... G07B 15/00 194/350
8,807,317 B2 8/2014 MacKay et al.
D714,165 S 9/2014 Salama
D716,156 S 10/2014 Jones et al.
D716,157 S 10/2014 MacKay et al.
D716,515 S 10/2014 Cha et al.
8,862,494 B2 10/2014 King et al.
D716,671 S 11/2014 Jones et al.
D722,740 S 2/2015 Budde et al.
D724,290 S 3/2015 Cha et al.
D724,811 S 3/2015 Reitinger
D724,812 S 3/2015 Cha et al.
D725,504 S * 3/2015 McEneany ..... D10/42
D728,190 S 4/2015 Sheley
9,002,723 B2 4/2015 King et al.
9,047,712 B2 6/2015 King et al.
D733,585 S 7/2015 Jones et al.
D735,437 S 7/2015 Randall
D735,438 S 7/2015 Randall
D735,439 S 7/2015 Randall
D735,440 S 7/2015 Randall
D735,963 S 8/2015 Randall
D735,964 S 8/2015 Randall
D735,965 S 8/2015 Randall
D739,637 S 9/2015 Randall
D739,638 S 9/2015 Randall
D739,639 S 9/2015 Randall
9,127,964 B2 9/2015 Schwarz et al.
D742,090 S 10/2015 Randall
9,196,097 B2 11/2015 Jones et al.
D746,015 S 12/2015 King et al.
D748,364 S 1/2016 King et al.
D748,888 S 2/2016 King et al.
D749,000 S 2/2016 King et al.
D750,513 S 3/2016 King et al.
D752,552 S * 3/2016 D'Ascanio ..... D14/216
D755,649 S 5/2016 King et al.
D755,650 S 5/2016 King et al.
D756,807 S 5/2016 King et al.
D756,808 S 5/2016 King et al.
D762,040 S 7/2016 King et al.
9,391,474 B2 7/2016 Hunter et al.
9,424,691 B2 8/2016 King et al.
9,508,198 B1 11/2016 King et al.
D779,771 S * 2/2017 King ..... D99/28
D779,772 S * 2/2017 King ..... D99/28
D779,773 S * 2/2017 King ..... D99/28
D779,774 S * 2/2017 King ..... D99/28
D781,024 S * 3/2017 King ..... D99/28
D791,621 S * 7/2017 Loye ..... D10/42
D795,523 S * 8/2017 King ..... D99/28
D813,059 S * 3/2018 MacKay ..... D10/42
D856,825 S * 8/2019 Ireland ..... D10/42
D863,988 S * 10/2019 MacKay ..... D10/42
2001/0012241 A1 8/2001 Dee et al.
2001/0047278 A1 11/2001 Brookner et al.
2001/0051531 A1 12/2001 Singhal et al.
2002/0008639 A1 1/2002 Dee
2002/0030606 A1 3/2002 Chauvin et al.
2002/0062172 A1 5/2002 Bench et al.
2002/0074344 A1 6/2002 Long et al.
2002/0080013 A1 6/2002 Anderson, III et al.
2002/0111768 A1 8/2002 Ghorayeb et al.
2002/0134645 A1 9/2002 Alexander et al.
2003/0017904 A1 1/2003 Lee
2003/0092387 A1 5/2003 Hjelmvik
2003/0112151 A1 6/2003 Chauvin et al.
2003/0112597 A1 6/2003 Smith
2003/0117904 A1 6/2003 Lank et al.
2003/0121754 A1 7/2003 King
2003/0128010 A1 7/2003 Hsu
2003/0128136 A1 7/2003 Spier et al.
2003/0132840 A1 7/2003 Bahar
2003/0135407 A1 7/2003 Reinhardt et al.
2003/0140531 A1 7/2003 Pippins
2003/0144905 A1 7/2003 Smith
2003/0144972 A1 7/2003 Cordery et al.
2003/0169183 A1 9/2003 Korepanov et al.
2003/0179107 A1 9/2003 Kibria et al.
2003/0220835 A1 11/2003 Barnes, Jr.
2003/0222792 A1 12/2003 Berman et al.
2003/0234888 A1 12/2003 Hong et al.
2004/0011099 A1 1/2004 Andersson
2004/0016796 A1 1/2004 Hanna et al.
2004/0039632 A1 2/2004 Han et al.
2004/0040028 A1 2/2004 Moreau
2004/0068434 A1 4/2004 Kanekon
2004/0084278 A1 5/2004 Harris et al.
2004/0094619 A1 5/2004 Silberberg
2004/0160905 A1 8/2004 Bernier et al.
2004/0181496 A1 9/2004 Odinotski et al.
2004/0232878 A1 11/2004 Couch et al.
2004/0243526 A1 12/2004 Krygler et al.
2004/0254900 A1 12/2004 Reinhard
2004/0262379 A1 12/2004 Gomes
2004/0263117 A1 12/2004 Kogan et al.
2004/0264302 A1 12/2004 Ward, II
2005/0029340 A1 2/2005 Ferraro 2005/0035740 A1 2/2005 Elder et al.
2005/0040951 A1 2/2005 Zalewski et al.
2005/0068201 A1 3/2005 Wulff et al.
2005/0155839 A1 7/2005 Banks et al.
2005/0168352 A1 8/2005 Tomer
2005/0178639 A1 8/2005 Brumfield et al.
2005/0192911 A1 9/2005 Mattern
2006/0020487 A1 1/2006 Spittel et al.
2006/0021848 A1 2/2006 Smith
2006/0114159 A1 6/2006 Yoshikawa et al.
2006/0116972 A1 6/2006 Wong
2006/0136131 A1 6/2006 Dugan et al.
2006/0149684 A1 7/2006 Matsuura et al.
2006/0152349 A1 7/2006 Ratnakar
2006/0152385 A1 7/2006 Mandy
2006/0173733 A1 8/2006 Fancher
2006/0255119 A1 11/2006 Marchasin et al.
2006/0259354 A1 11/2006 Yan
2006/0267799 A1 11/2006 Mendelson
2007/0011700 A1 1/2007 Johnson
2007/0016539 A1 1/2007 Groft et al.
2007/0017265 A1 1/2007 Andersson
2007/0029825 A1 2/2007 Franklin et al.
2007/0044523 A1 3/2007 Davis
2007/0046651 A1 3/2007 Sinclair et al.
2007/0061155 A1 3/2007 Ji et al.
2007/0094153 A1 4/2007 Ferraro
2007/0114849 A1 5/2007 Falik et al.
2007/0119682 A1 5/2007 Banks et al.
2007/0129974 A1 6/2007 Chen et al.
2007/0136128 A1 6/2007 Janacek et al.
2007/0171069 A1 7/2007 Allen
2007/0184852 A1 8/2007 Johnson et al.
2007/0208499 A1 9/2007 Kwong
2007/0210935 A1 9/2007 Yost
2007/0276724 A1 11/2007 Catt
2007/0285281 A1 12/2007 Welch
2008/0071611 A1 3/2008 Lovett
2008/0093454 A1 4/2008 Yamazaki et al.
2008/0147268 A1 6/2008 Fuller
2008/0158010 A1 7/2008 Nath et al.
2008/0165030 A1 7/2008 Kuo et al.
2008/0208680 A1 8/2008 Cho
2008/0218383 A1 9/2008 Franklin et al.
2008/0238715 A1 10/2008 Cheng et al.
2008/0245638 A1 10/2008 King et al.
2008/0257965 A1 10/2008 Klein et al.
2008/0265019 A1 10/2008 Artino et al.
2008/0266138 A1 10/2008 Ponert
2008/0270227 A1 10/2008 Al Amri
2008/0277468 A1 11/2008 Mitschele
2008/0289030 A1 11/2008 Poplett
2008/0291054 A1 11/2008 Groft
2008/0296365 A1 12/2008 Schliebe
2008/0319837 A1 12/2008 Mitschele
2009/0026842 A1 1/2009 Hunter et al.
2009/0032368 A1 2/2009 Hunter et al.
2009/0049875 A1 2/2009 Buhl et al.
2009/0057398 A1 3/2009 Douglass et al.
2009/0083149 A1 3/2009 Maekawa et al.
2009/0095593 A1 4/2009 King et al.
2009/0099761 A1 4/2009 Davis et al.
2009/0102726 A1 4/2009 Imano et al.
2009/0109062 A1 4/2009 An
2009/0137204 A1 5/2009 Chang
2009/0159674 A1 6/2009 King et al.
2009/0183966 A1 7/2009 King et al.
2009/0192950 A1 7/2009 King et al.
2009/0199966 A1 9/2009 Coleman et al.
2009/0254438 A1 10/2009 Johnson, Jr. et al.
2009/0267732 A1 10/2009 Chauvin et al.
2009/0284907 A1 11/2009 Regimbal et al.
2009/0287578 A1 11/2009 Paluszek et al.
2009/0315720 A1 12/2009 Clement et al.
2010/0019936 A1 1/2010 Kaveler
2010/0025459 A1 2/2010 Yamada
2010/0026522 A1 2/2010 Ward, II
2010/0030629 A1 2/2010 Ward, II
2010/0106517 A1 4/2010 Kociubinski et al.
2010/0153193 A1 6/2010 Ashby et al.
2010/0161489 A1 6/2010 Goodall et al.
2010/0187300 A1 7/2010 Ramachandran et al.
2010/0188932 A1 7/2010 Hanks et al.
2010/0241564 A1 9/2010 Miller et al.
2010/0243729 A1 9/2010 Russell et al.
2010/0328104 A1 12/2010 Groft
2010/0332394 A1 12/2010 Ioli
2011/0022427 A1 1/2011 Dayan
2011/0037562 A1 2/2011 Braukmann et al.
2011/0057815 A1 3/2011 King et al.
2011/0060653 A1 3/2011 King et al.
2011/0062230 A1 3/2011 Ward, II et al.
2011/0063133 A1 3/2011 Keller et al.
2011/0066297 A1 3/2011 Saberi et al.
2011/0093314 A1 4/2011 Redmann et al.
2011/0122036 A1 5/2011 Leung et al.
2011/0133613 A1 6/2011 Descamps et al.
2011/0158331 A1 6/2011 Kavaler et al.
2011/0203901 A1 8/2011 King et al.
2011/0205087 A1 8/2011 Kell et al.
2011/0221624 A1 9/2011 Kavaler
2011/0241442 A1 10/2011 Mittleman et al.
2011/0261548 A1 10/2011 Gandhi
2011/0276519 A1 11/2011 MacKay et al.
2011/0313822 A1 12/2011 Burdick
2011/0320243 A1 12/2011 Khan
2012/0026015 A1 2/2012 Kavaler
2012/0158466 A1 6/2012 John
2012/0173171 A1 7/2012 Bajwa et al.
2012/0208521 A1 8/2012 Häger et al.
2012/0222935 A1 9/2012 MacKay et al.
2012/0273322 A1 11/2012 MacKay et al.
2012/0285790 A1 11/2012 Jones et al.
2012/0285791 A1 11/2012 Jones et al.
2012/0285792 A1 11/2012 Jones et al.
2012/0285793 A1 11/2012 Jones et al.
2012/0286036 A1 11/2012 Jones et al.
2012/0286968 A1 11/2012 Jones et al.
2012/0292385 A1 11/2012 MacKay et al.
2013/0005445 A1 1/2013 Walker et al.
2013/0021201 A1 1/2013 del Castillo et al.
2013/0027218 A1 1/2013 Schwarz et al.
2013/0085928 A1 4/2013 McKinney
2013/0099943 A1 4/2013 Subramanya
2013/0124270 A1 5/2013 Tziperman et al.
2013/0238406 A1 9/2013 King et al.
2013/0285455 A1 10/2013 Hunter et al.
2014/0040028 A1 2/2014 King et al.
2014/0058805 A1 2/2014 Paesler et al.
2014/0108107 A1 4/2014 Jones et al.
2014/0129158 A1 5/2014 Shea
2014/0172518 A1 6/2014 King et al.
2014/0174881 A1 6/2014 King et al.
2014/0210646 A1 7/2014 Subramanya
2014/0213176 A1 7/2014 Mendelson
2014/0214499 A1 7/2014 Hudson et al.
2014/0231505 A1 8/2014 King et al.
2014/0279565 A1 9/2014 Trump et al.
2014/0289025 A1 9/2014 King et al.
2014/0319211 A1 10/2014 MacKay et al.
2015/0084786 A1 3/2015 King et al.
2015/0106172 A1 8/2015 Salama
2015/0235503 A1 8/2015 King et al.
2016/0012418 A1 1/2016 MacKay et al.
2016/0268838 A1 9/2016 Hunter et al.
2016/0321714 A1 11/2016 King et al.
2016/0371915 A1 12/2016 MacKay et al.
2017/0034600 A1 2/2017 King et al.
2018/0322534 A1* 11/2018 King ..... G09F 23/00

FOREIGN PATENT DOCUMENTS

CA 2373400 A1 * 8/2001 ..... G07B 15/02
FR 2600448 A1 * 12/1987 ..... G06Q 20/0652

OTHER PUBLICATIONS

US 8,636,133 B2, 01/2014, MacKay et al. (withdrawn)

* cited by examiner

*Primary Examiner* — Darlington Ly
(74) *Attorney, Agent, or Firm* — LKGlobal | Lorenz & Kopf, LLP

(57) CLAIM

The ornamental design for a parking meter, as shown and described.

DESCRIPTION

FIG. 1 is a front perspective view of a first embodiment of a parking meter;
FIG. 2 is a rear perspective view of a first embodiment of a parking meter;
FIG. 3 is a left side view of a first embodiment of a parking meter;
FIG. 4 is a front view of a first embodiment of a parking meter;
FIG. 5 is a right side view of a first embodiment of a parking meter;
FIG. 6 is a rear view of a first embodiment of a parking meter;
FIG. 7 is a top view of a first embodiment of a parking meter;
FIG. 8 is a front perspective view of a second embodiment of a parking meter;
FIG. 9 is a rear perspective view of a second embodiment of a parking meter;
FIG. 10 is a left side view of a second embodiment of a parking meter;
FIG. 11 is a front view of a second embodiment of a parking meter;
FIG. 12 is a right side view of a second embodiment of a parking meter;
FIG. 13 is a rear view of a second embodiment of a parking meter; and,
FIG. 14 is a top view of a second embodiment of a parking meter.
The broken lines showing portions of the parking meter are included for the purpose of illustrating portions of the article and form no part of the claimed design.

1 Claim, 8 Drawing Sheets

Matter enclosed in heavy brackets [ ] appears in the original patent but forms no part of this reissue; matter printed in italics indicates the additions made by reissue.

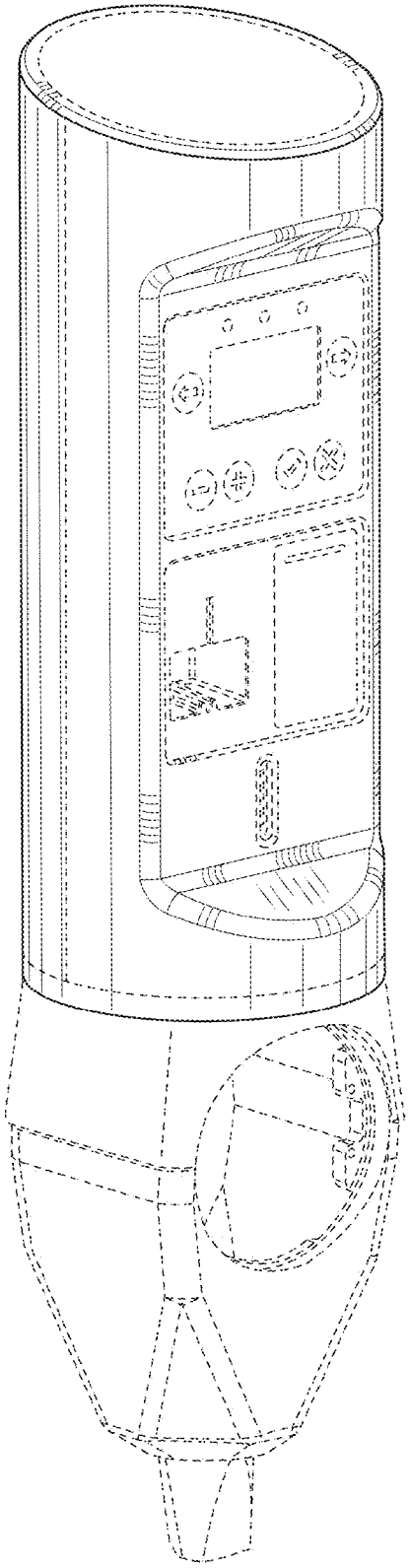
FIG. 1
Amended
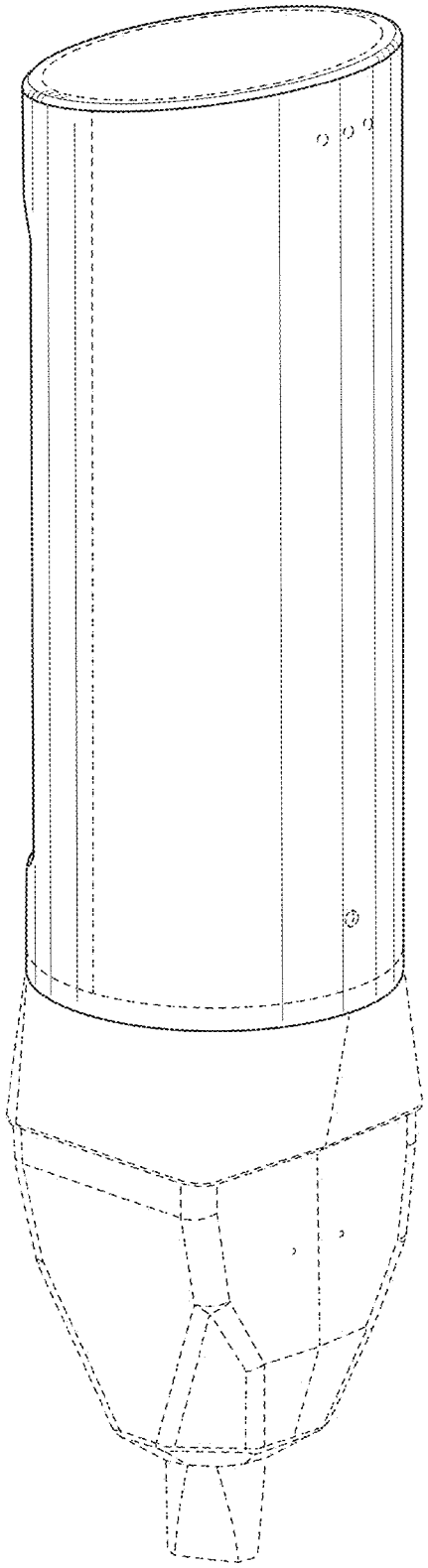
FIG. 2
Amended

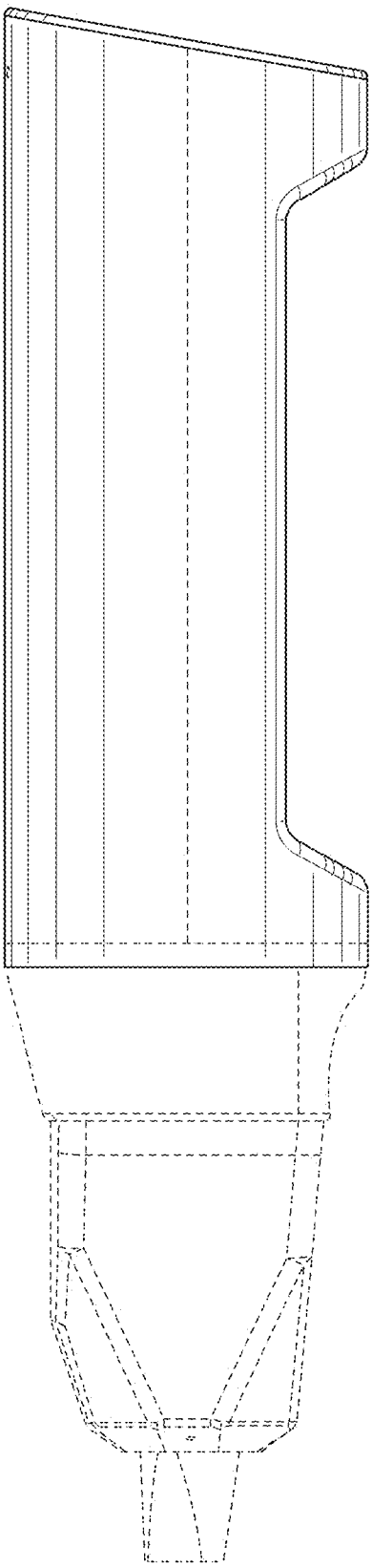
FIG. 3
Amended
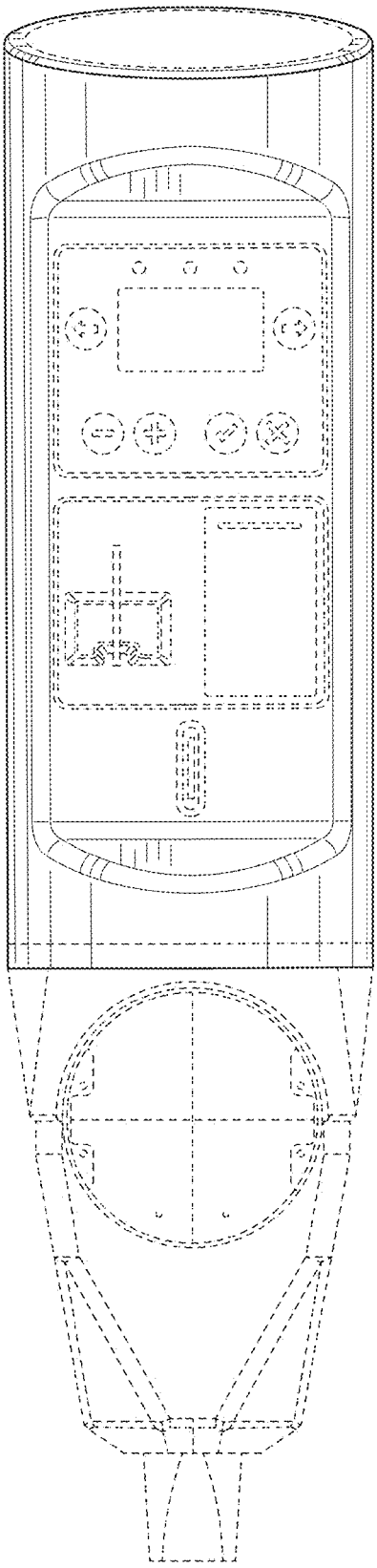
FIG. 4
Amended

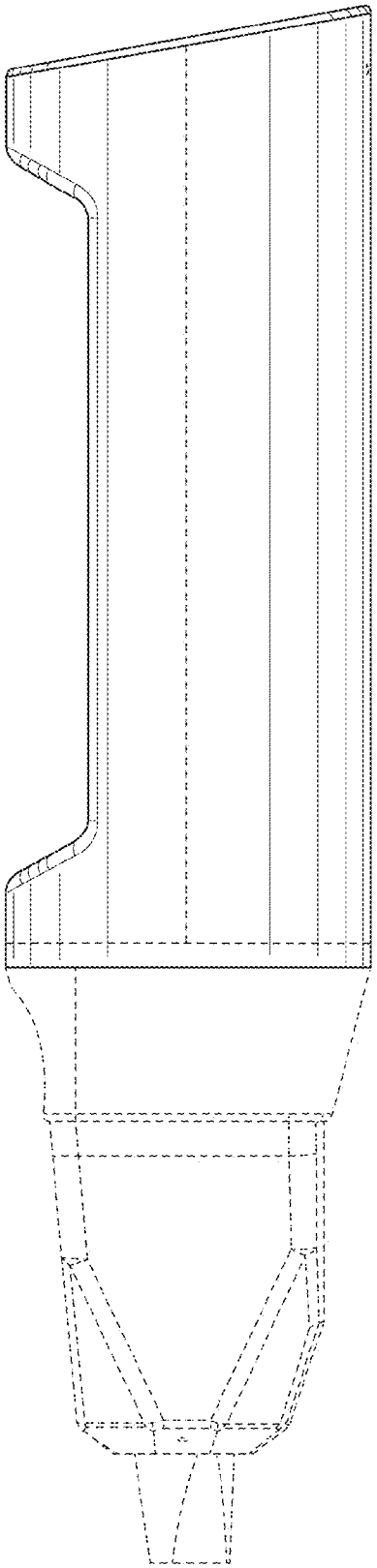
FIG. 5
Amended
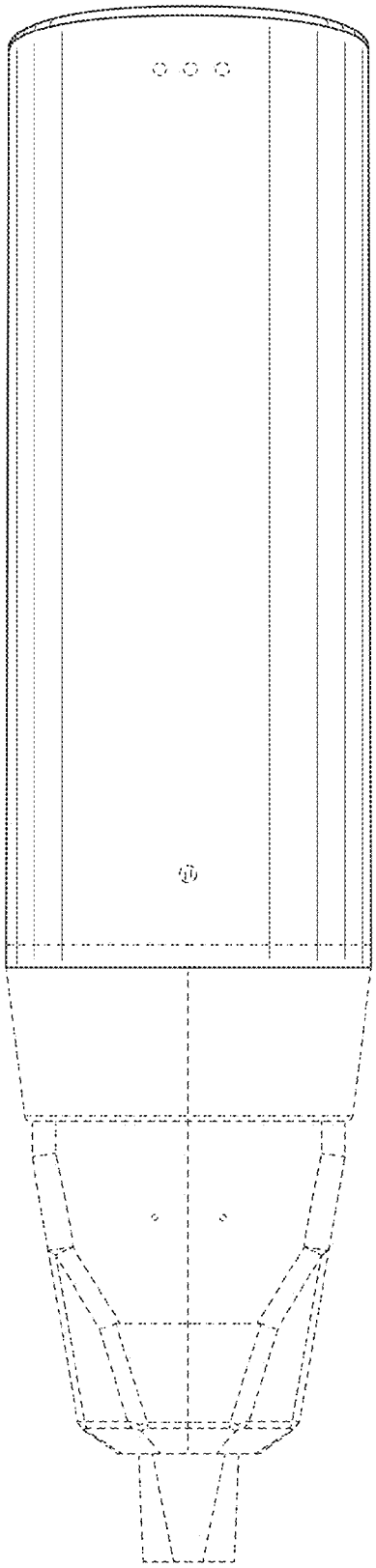
FIG. 6
Amended

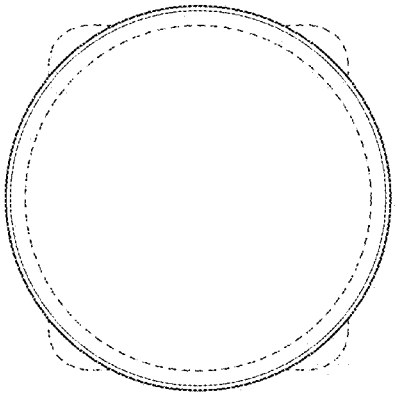
FIG. 7
Amended

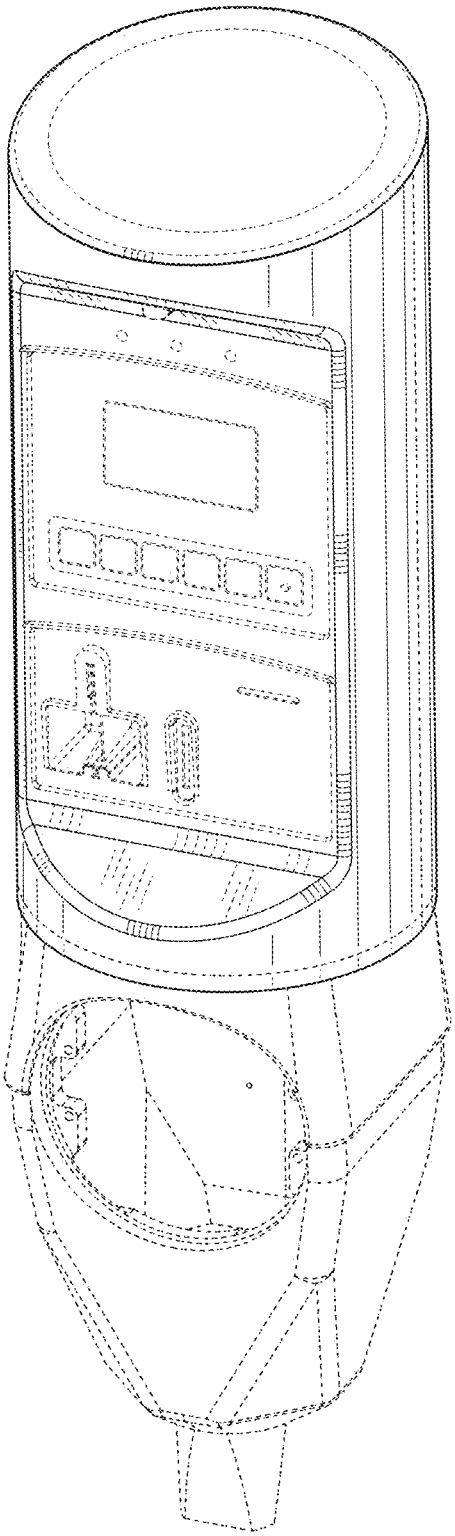
FIG. 8
Amended
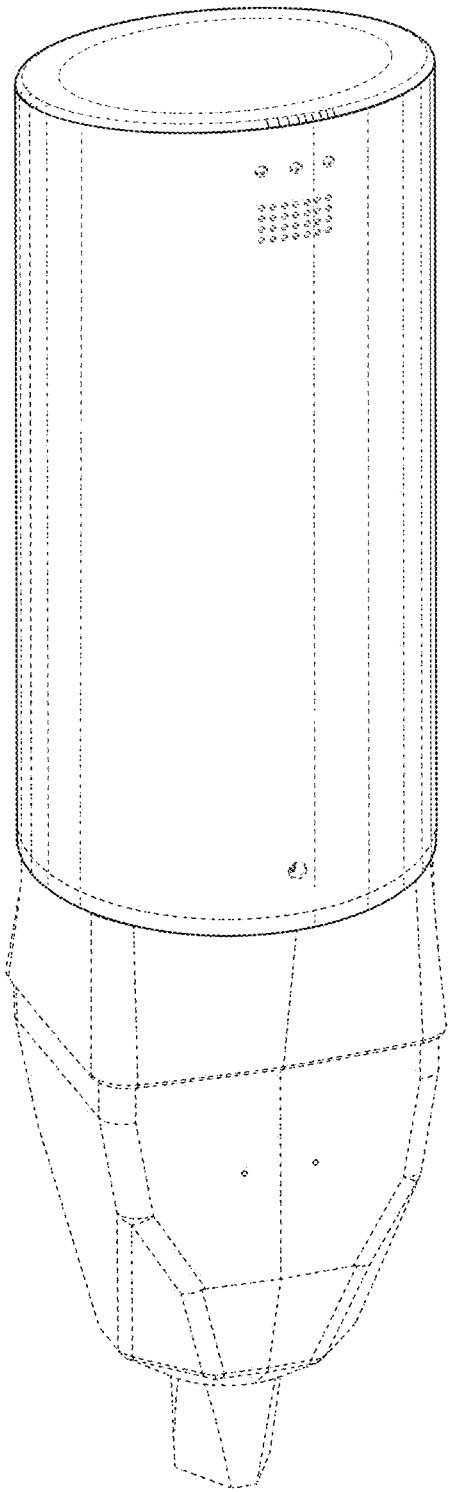
FIG. 9
Amended

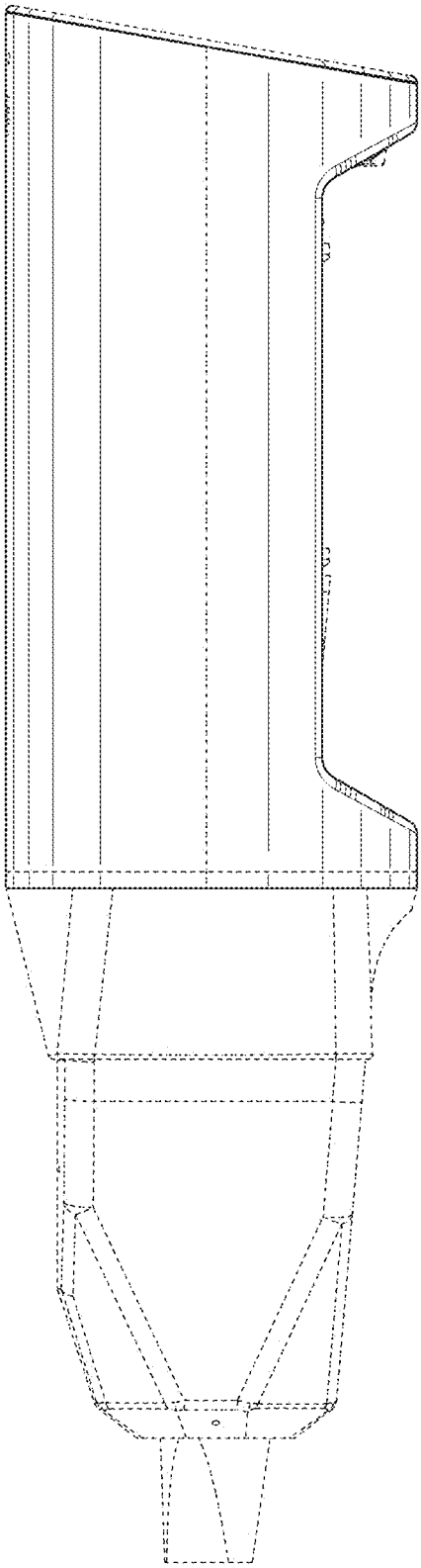
FIG. 10
Amended
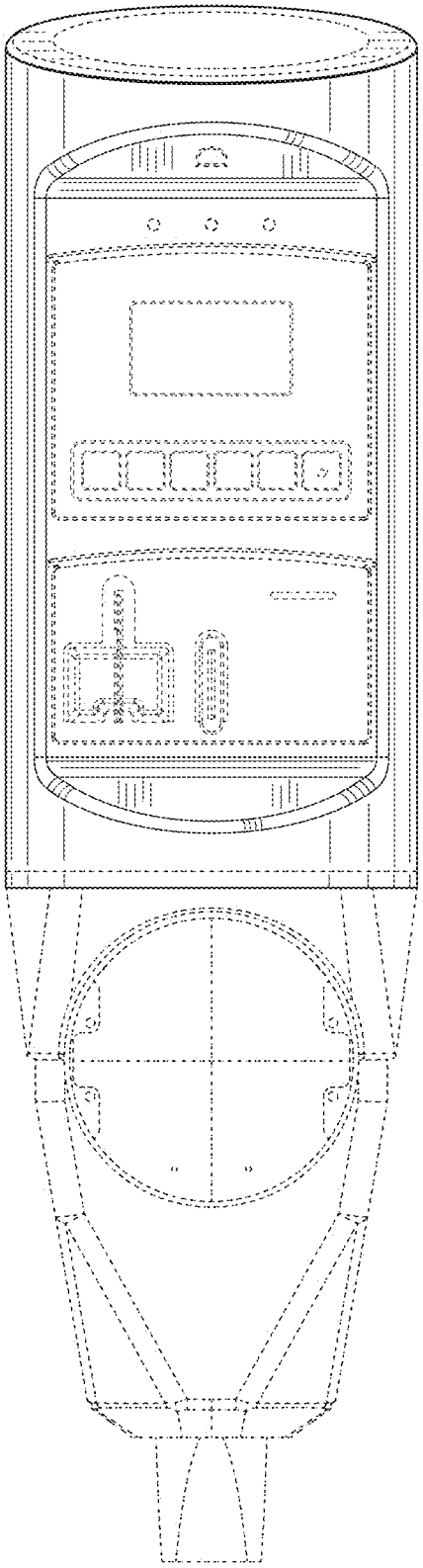
FIG. 11
Amended

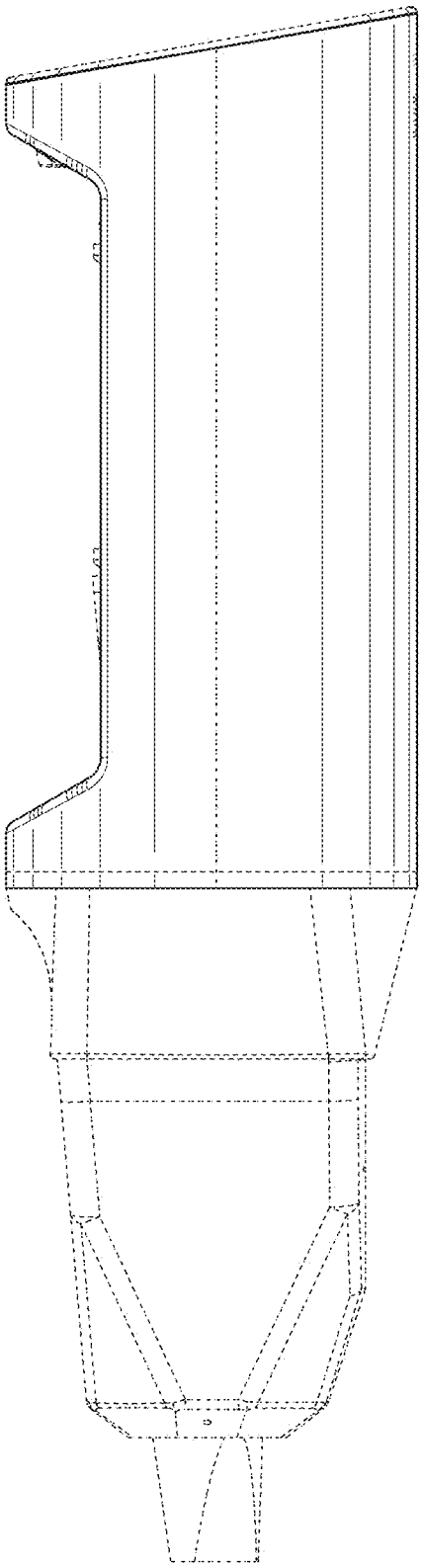
FIG. 12
Amended
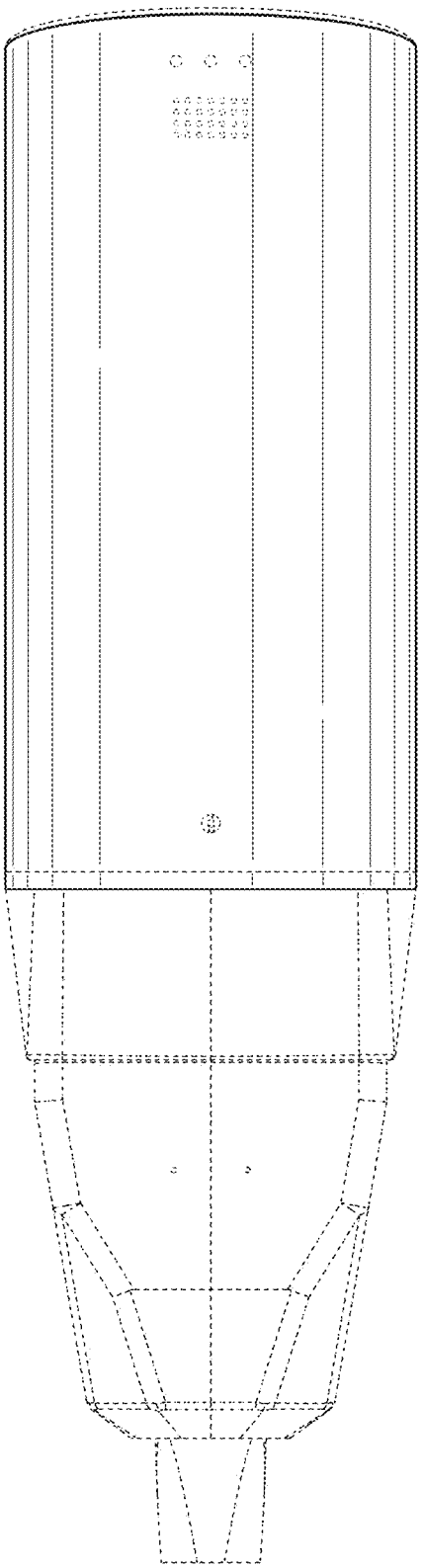
FIG. 13
Amended

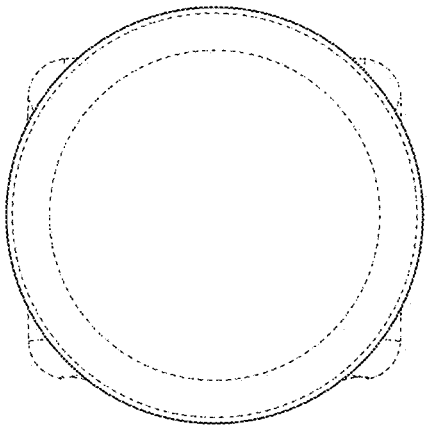
FIG. 14
Amended